(12) United States Patent
Sibbach et al.

(10) Patent No.: US 12,085,024 B2
(45) Date of Patent: *Sep. 10, 2024

(54) HIGH FAN TIP SPEED ENGINE

(71) Applicant: General Electric Company, Schenectady, NY (US)

(72) Inventors: Arthur William Sibbach, Boxford, MA (US); Brandon Wayne Miller, Liberty Township, OH (US); Christopher James Kroger, West Chester, OH (US); Jeffrey Donald Clements, Mason, OH (US); Sean Christopher Binion, Loveland, OH (US); Tsuguji Nakano, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,201

(22) Filed: Apr. 26, 2023

(65) Prior Publication Data

US 2023/0258134 A1 Aug. 17, 2023

Related U.S. Application Data

(63) Continuation of application No. 17/384,999, filed on Jul. 26, 2021, now Pat. No. 11,655,768.

(51) Int. Cl.
*F02C 7/36* (2006.01)
*F02K 3/06* (2006.01)

(52) U.S. Cl.
CPC .................. *F02C 7/36* (2013.01); *F02K 3/06* (2013.01); *F05D 2220/36* (2013.01); *F05D 2260/40311* (2013.01); *F05D 2260/606* (2013.01)

(58) Field of Classification Search
None
See application file for complete search history.

(56) References Cited

U.S. PATENT DOCUMENTS 11,655,768 B2 * 5/2023 Sibbach ............... F02C 7/36
415/122.1

* cited by examiner

*Primary Examiner* — Michael Lebentritt
(74) *Attorney, Agent, or Firm* — Dority & Manning, P.A.

(57) ABSTRACT

A turbofan engine is provided. The turbofan engine includes a fan comprising a plurality of rotatable fan blades, each fan blade defining a fan tip speed; a turbomachine operably coupled to the fan for driving the fan, the turbomachine comprising a compressor section, a combustion section, and a turbine section in serial flow order and together defining a core air flowpath; and a gear box, wherein the turbomachine is operably coupled to the fan through the gear box, wherein a gear ratio of the gear box is greater than or equal to 1.2 and less than or equal to 3.0; wherein during operation of the turbofan engine at a rated speed the fan tip speed is greater than or equal to 1000 feet per second. In exemplary embodiments, during operation of the turbofan engine at the rated speed the fan pressure ratio is less than or equal to about 1.5.

17 Claims, 7 Drawing Sheets

HIGH FAN TIP SPEED ENGINE

CROSS-REFERENCE TO RELATED APPLICATIONS

The present application is a continuation of and claims priority to U.S. application Ser. No. 17/384,999 entitled "High Fan Tip Speed Engine", filed Jul. 26, 2021, the entire disclosure of which is hereby expressly incorporated by reference herein.

FIELD

The present subject matter relates generally to a gas turbine engine, or more particularly to a gas turbine engine configured to operate in a more efficient manner.

BACKGROUND

A turbofan engine generally includes a fan having a plurality of fan blades and a turbomachine arranged in flow communication with one another. Additionally, the turbomachine of the turbofan engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

However, efficiency losses in an upper span of the fan blades may result in a less efficient turbofan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
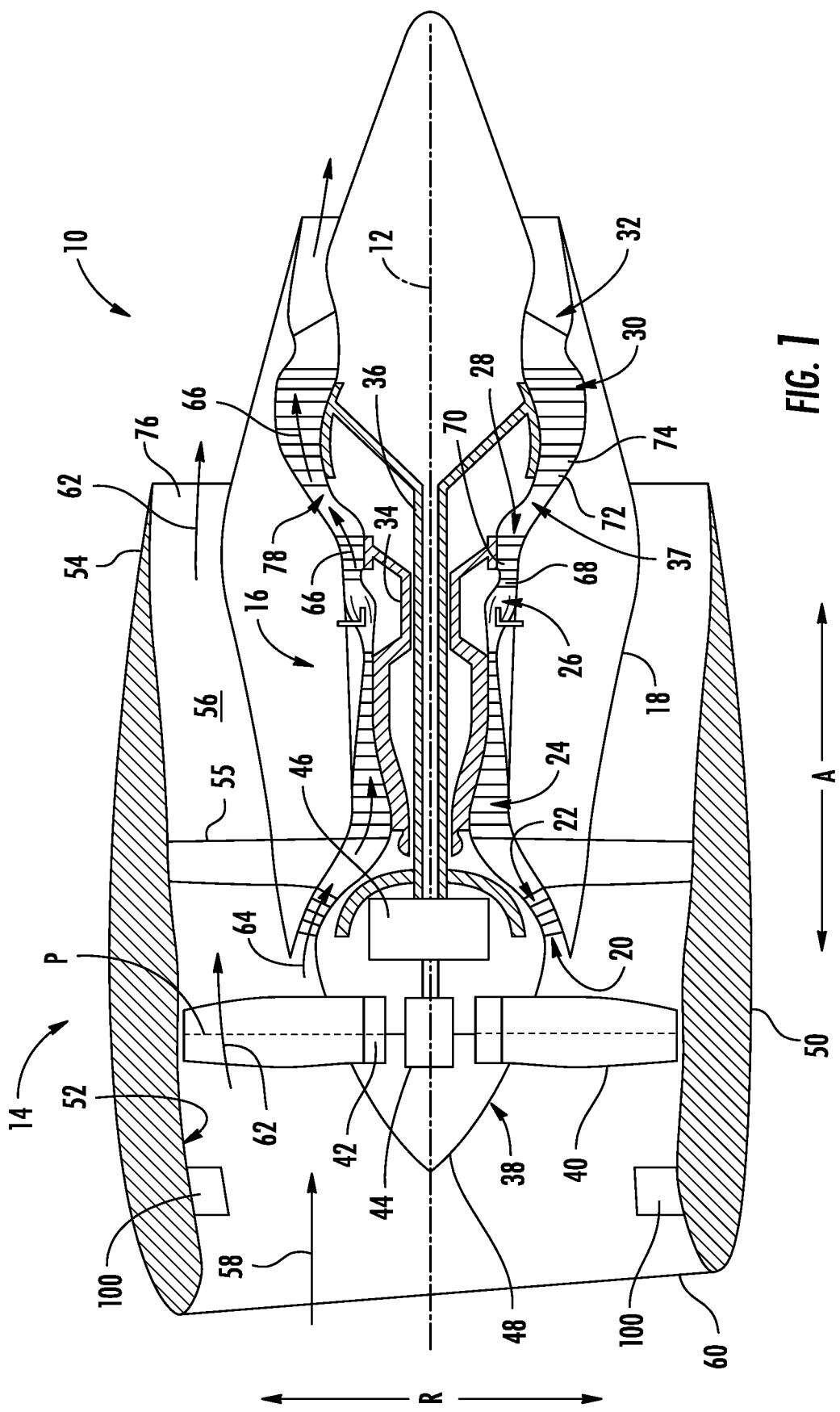
FIG. 1 is a schematic cross-sectional view of an exemplary gas turbine engine according to an exemplary embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "fan pressure ratio" refers to a ratio of an air pressure immediately downstream of the fan blades if a fan during operation of the fan to an air pressure immediately upstream of the fan blades of the fan during operation of the fan.

As used herein, the term "rated speed" with reference to a turbofan engine refers to a maximum rotational speed that the turbofan engine may achieve while operating properly. For example, the turbofan engine may be operating at the rated speed during maximum load operations, such as during takeoff operations.

Also as used herein, the term "fan tip speed" as defined by the plurality of fan blades of the fan refers to a linear speed of an outer tip of a fan blade along a radial direction during operation of the fan.

The present disclosure is generally related to a turbofan engine having a fan defining a fan pressure ratio and a turbomachine operably coupled to the fan for driving the fan. The turbomachine defines a core air flowpath therethrough. Additionally, the fan of the turbofan engine includes a plurality of rotatable fan blades each defining a fan tip speed. The turbofan engine of the present disclosure also includes a gear box, wherein the turbomachine is operably coupled to the fan through the gear box, wherein a gear ratio of the gear box is greater than or equal to 1.2 and less than or equal to 3.0. Furthermore, during operation of the turbofan engine at a rated speed the fan tip speed is greater than or equal to 1000 feet per second. In an exemplary embodiment, during operation of the turbofan engine at the rated speed the fan pressure ratio is less than or equal to about 1.5.

It should be appreciated that the exemplary turbofan engine described operates contrary to conventional teachings. Specifically, conventional engine operation teachings generally attempt to minimize fan speed with such gear ratios. For example, conventional engine operation teach low fan speeds for better efficiencies. However, the turbofan engine described herein operates contrary to these teachings by reducing the gear ratio while operating at a high fan tip speed, while maintaining a relatively low fan pressure ratio. The turbofan engine of the present disclosure achieves improved system efficiencies by enabling higher fan tip speeds at lower fan pressure ratios. Furthermore, the turbofan engine of the present disclosure also provides preswirling flow forward of the fan blade tip as described herein. Such may facilitate operation of the turbofan engine at the relatively high fan tip speeds without creating undesirably high losses at the outer ends of the fan blades (e.g., as a result of the airflow over the fan blades separating and generating a turbulence in the airflow).

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10", configured to be mounted to an aircraft, such as in an under-wing configuration or tail-mounted configuration. As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Accordingly, for the embodiment depicted, the turbomachine 16 is operably coupled to the fan 38 through the power gear box 46.

In exemplary embodiments, the fan section 14 includes twenty-two (22) or fewer fan blades 40. In certain exemplary embodiments, the fan section 14 includes twenty (20) or fewer fan blades 40. In certain exemplary embodiments, the fan section 14 includes eighteen (18) or fewer fan blades 40. In certain exemplary embodiments, the fan section 14 includes sixteen (16) or fewer fan blades 40. In certain exemplary embodiments, it is contemplated that the fan section 14 includes other number of fan blades 40 for a particular application.

During operation of the turbofan engine 10, the fan 38 defines a fan pressure ratio and the plurality of fan blades 40 each define a fan tip speed. As will be described in greater detail below, the exemplary turbofan engine 10 depicted defines a relatively high fan tip speed and relatively low fan pressure ratio during operation of the turbofan engine at a rated speed. As used herein, the term "fan pressure ratio" refers to a ratio of an air pressure immediately downstream of the fan blades 40 during operation of the fan 38 to an air pressure immediately upstream of the fan blades 40 during operation of the fan 38. For the embodiment depicted in FIG. 1, the fan 38 of the turbofan engine 10 defines a relatively low fan pressure ratio. For example, the turbofan engine 10 depicted defines a fan pressure ratio less than or equal to about 1.5. For example, in certain exemplary embodiments, the turbofan engine 10 may define a fan pressure ratio less than or equal to about 1.4. The fan pressure ratio may be the fan pressure ratio of the fan 38 during operation of the turbofan engine 10, such as during operation of the turbofan engine 10 at a rated speed.

As used herein, the term "rated speed" with reference to the turbofan engine 10 refers to a maximum rotational speed that the turbofan engine 10 may achieve while operating properly. For example, the turbofan engine 10 may be operating at the rated speed during maximum load operations, such as during takeoff operations.

Also as used herein, the term "fan tip speed" defined by the plurality of fan blades 40 refers to a linear speed of an outer tip of a fan blade 40 along the radial direction R during operation of the fan 38. In exemplary embodiments, the turbofan engine 10 of the present disclosure causes the fan blades 40 of the fan 38 to rotate at a relatively high rotational speed. For example, during operation of the turbofan engine 10 at the rated speed, the fan tip speed of each of the plurality of fan blades 40 is greater than or equal to 1000 feet per second and less than or equal to 2250 feet per second. In certain exemplary embodiments, during operation of the turbofan engine 10 at the rated speed, the fan tip speed of each of the fan blades 40 may be greater than or equal to 1,250 feet per second and less than or equal to 2250 feet per second. In certain exemplary embodiments, during operation of the turbofan engine 10 at the rated speed, the fan tip speed of each of the fan blades 40 may be greater than or equal to about 1,350 feet per second, such as greater than about 1,450 feet per second, such as greater than about 1,550 feet per second, and less than or equal to 2250 feet per second.

Referring still to the exemplary embodiment of FIG. 1, the disk 42 is covered by rotatable front nacelle or hub 48 aerodynamically contoured to promote an airflow through the plurality of fan blades 40. Additionally, the exemplary fan section 14 includes an annular fan casing or outer nacelle 50 that at least partially, and for the embodiment depicted, circumferentially, surrounds the fan 38 and at least a portion of the turbomachine 16.

More specifically, the nacelle 50 includes an inner wall 52 and a downstream section 54 of the inner wall 52 of the nacelle 50 extends over an outer portion of the turbomachine 16 so as to define a bypass airflow passage 56 therebetween. Additionally, for the embodiment depicted, the nacelle 50 is supported relative to the turbomachine 16 by a plurality of circumferentially spaced outlet guide vanes 55.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37. The ratio between an amount of airflow through the bypass passage 56 (i.e., the first portion of air indicated by arrows 62) to an amount of airflow through the core air flowpath 37 (i.e., the second portion of air indicated by arrows 64) is known as a bypass ratio.

In exemplary embodiments, the bypass ratio during operation of the turbofan engine 10 (e.g., at a rated speed) is less than or equal to about eleven (11). For example, the bypass ratio during operation of the turbofan engine 10 (e.g., at a rated speed) may be less than or equal to about ten (10), such as less than or equal to about nine (9). Additionally, the bypass ratio may be at least about two (2).

In other exemplary embodiments, the bypass ratio may generally be between about 7:1 and about 20:1, such as between about 10:1 and about 18:1. The pressure of the second portion of air 64 is then increased as it is routed through the high pressure (HP) compressor 24 and into the combustion section 26, where it is mixed with fuel and burned to provide combustion gases 66.

In exemplary embodiments, a gear ratio of the gear box 46 is greater than or equal to 1.2 and less than or equal to 3.0. In some exemplary embodiments, the gear ratio of the gear box 46 is greater than or equal to 1.2 and less than or equal to 2.6. In other exemplary embodiments, the gear ratio of the gear box 46 is greater than or equal to 1.2 and less than or equal to 2.0.

It should be appreciated that the exemplary turbofan engine described operates contrary to conventional teachings. Specifically, conventional engine operation teachings generally attempt to minimize fan speed with such gear ratios. For example, conventional engine operation teach low fan speeds for better efficiencies. However, the turbofan engine 10 described herein operates contrary to these teachings by reducing the gear ratio while operating at a high fan tip speed, while maintaining a relatively low fan pressure ratio. The turbofan engine of the present disclosure achieves improved system efficiencies by enabling higher fan tip speeds at lower fan pressure ratios. Furthermore, the turbofan engine of the present disclosure also provides pre-swirling flow forward of the fan blade tip as described herein.

Referring still to FIG. 1, the compressed second portion of air 64 from the compressor section mixes with fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust.

Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

In some exemplary embodiments, it will be appreciated that the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least about 20,000 pounds of thrust, such as at least about 25,000 pounds of thrust, such as at least about 30,000 pounds of thrust. Accordingly, the turbofan engine 10 may be referred to as a relatively large power class gas turbine engine.

Moreover, it should be appreciated that the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan. Additionally, or alternatively, aspects of the present disclosure may be utilized with any other suitable aeronautical gas turbine engine, such as a turboshaft engine, turboprop engine, turbojet engine, etc.

Figure 2:
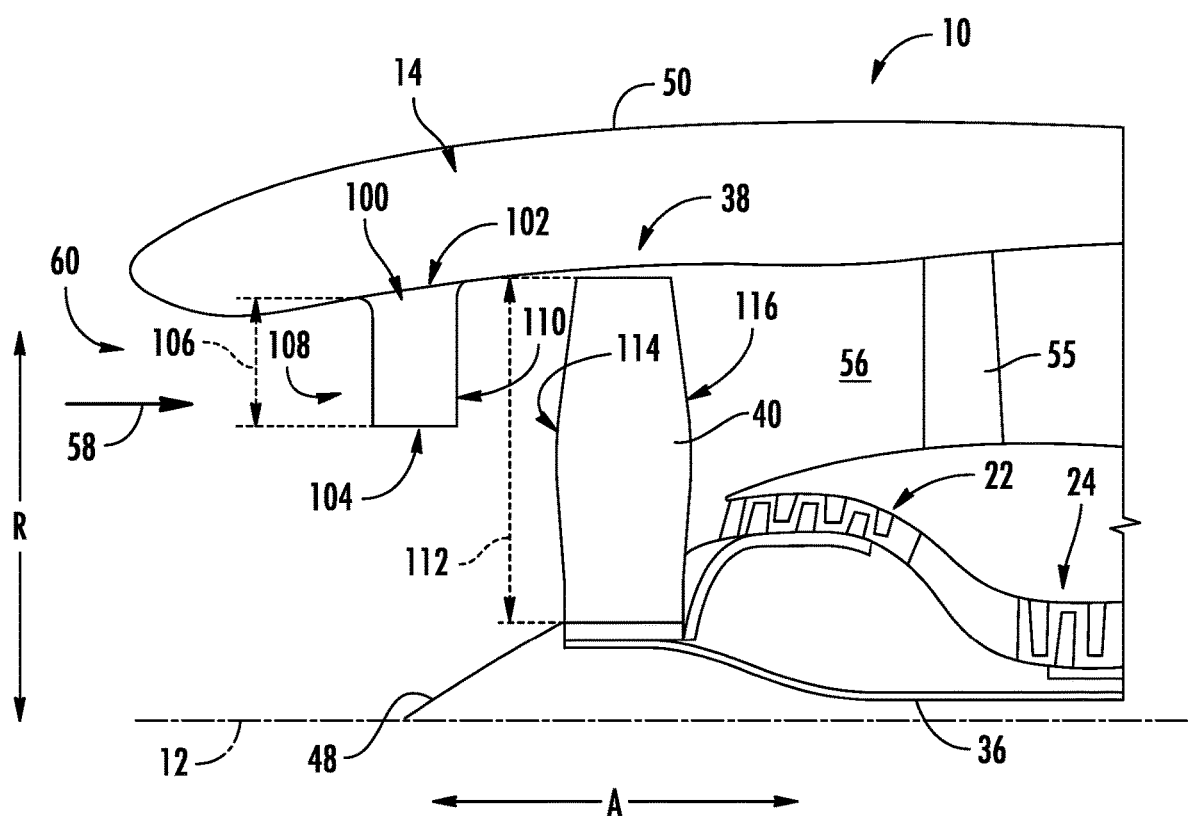
FIG. 2 is a close-up, schematic, cross-sectional view of a forward end of the exemplary gas turbine engine of FIG. 1 according to an exemplary embodiment of the present subject matter.

As discussed above, the turbofan engine 10 of the present disclosure also provides pre-swirling flow forward of the fan blade tip. Referring now also to FIG. 2, a close-up, cross-sectional view of the fan section 14 and forward end of the turbomachine 16 of the exemplary turbofan engine 10 of FIG. 1 is provided. In exemplary embodiments, the turbofan engine 10 includes an inlet pre-swirl feature located upstream of the plurality of fan blades 40 of the fan 38 and attached to or integrated into the nacelle 50. More specifically, for the embodiment of FIGS. 1 and 2, the inlet pre-swirl feature is configured as a plurality of part span inlet guide vanes 100. The plurality of part span inlet guide vanes 100 are each cantilevered from of the outer nacelle 50 (such as from the inner wall 52 of the outer nacelle 50) at a location forward of the plurality of fan blades 40 of the fan 38 along the axial direction A and aft of the inlet 60 of the nacelle 50. More specifically, each of the plurality of part span inlet guide vanes 100 define an outer end 102 along the radial direction R, and are attached to/connected to the outer nacelle 50 at the radially outer end 102 through a suitable connection means (not shown). For example, each of the plurality of part span inlet guide vanes 100 may be bolted to the inner wall 52 of the outer nacelle 50 at the outer end 102, welded to the inner wall 52 of the outer nacelle 50 at the outer end 102, or attached to the outer nacelle 50 in any other suitable manner at the outer end 102.

Further, for the embodiment depicted, the plurality of part span inlet guide vanes 100 extend generally along the radial direction R from the outer end 102 to an inner end 104 (i.e., an inner end 104 along the radial direction R). Moreover, as will be appreciated, for the embodiment depicted, each of the plurality of part span inlet guide vanes 100 are unconnected with an adjacent part span inlet guide vane 100 at the respective inner ends 104 (i.e., adjacent part span inlet guide vanes 100 do not contact one another at the radially inner ends 104, and do not include any intermediate connection members at the radially inner ends 104, such as a connection ring, strut, etc.). More specifically, for the embodiment depicted, each part span inlet guide vane 100 is completely supported by a connection to the outer nacelle 50 at the respective outer end 102 (and not through any structure extending, e.g., between adjacent part span inlet guide vanes 100 at a location inward of the outer end 102 along the radial direction R). As will be discussed below, such may reduce an amount of turbulence generated by the part span inlet guide vanes 100.

Moreover, is depicted, each of the plurality of part span inlet guide vanes 100 do not extend completely between the outer nacelle 50 and, e.g., the hub 48 of the turbofan engine 10. More specifically, for the embodiment depicted, each of the plurality of inlet guide vane define an inlet guide vane ("IGV") span 106 along the radial direction R, and further each of the plurality of part span inlet guide vanes 100 further define a leading edge 108 and a trailing edge 110. The IGV span 106 refers to a measure along the radial direction R between the outer end 102 and the inner end 104 of the part span inlet guide vane 100 at the leading edge 108 of the part span inlet guide vane 100. Similarly, it will be appreciated, that the plurality of fan blades 40 of the fan 38 define a fan blade span 112 along the radial direction R. More specifically, each of the plurality of fan blades 40 of the fan 38 also defines a leading edge 114 and a trailing edge 116, and the IGV span 106 refers to a measure along the radial direction R between a radially outer tip and a base of the fan blade 40 at the leading edge 114 of the respective fan blade 40.

For the embodiment depicted, the IGV span 106 is at least about five percent of the fan blade span 112 and up to about fifty-five percent of the fan blade span 112. For example, in certain exemplary embodiments, the IGV span 106 may be between about fifteen percent of the fan blade span 112 and about forty-five percent of the fan blade span 112, such as between about thirty percent of the fan blade span 112 and about forty percent of the fan blade span 112.

Figure 3:
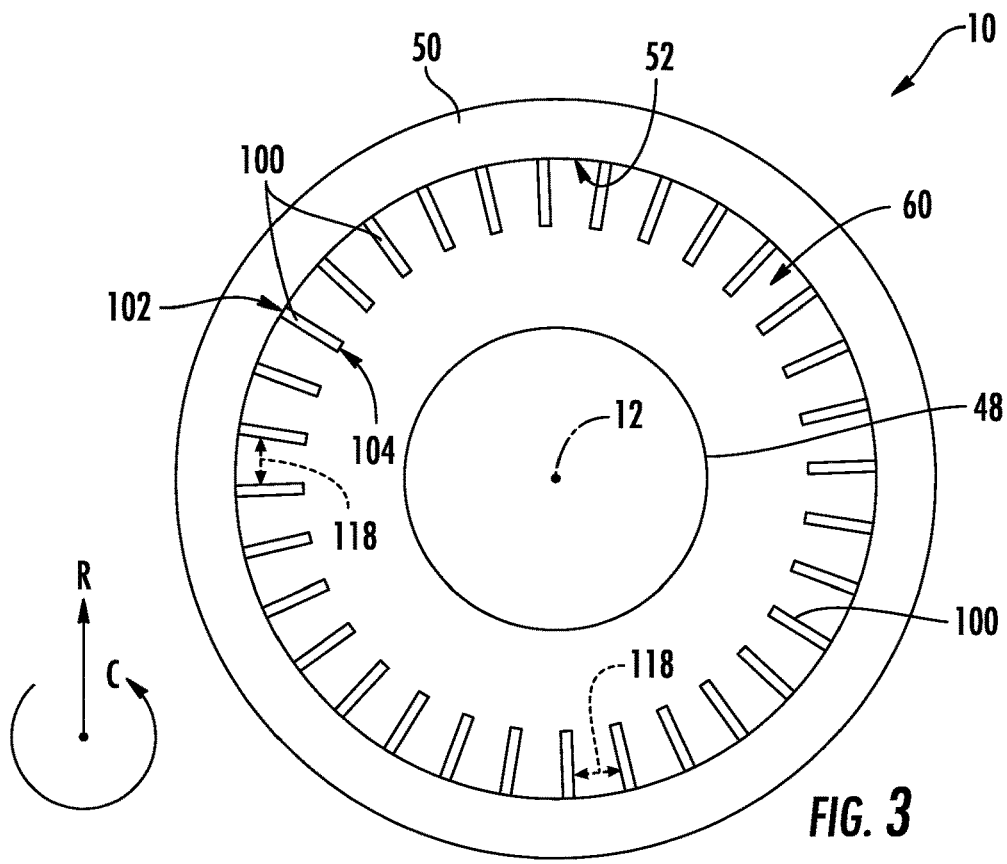
FIG. 3 is a schematic view of an inlet to the exemplary gas turbine engine of FIG. 1, along an axial direction of the gas turbine engine of FIG. 1 according to an exemplary embodiment of the present subject matter.

Reference will now also be made to FIG. 3, providing an axial view of the inlet 60 to the turbofan engine 10 of FIGS. 1 and 2. As will be appreciated, for the embodiment depicted, the plurality of part span inlet guide vanes 100 of the turbofan engine 10 includes a relatively large number of part span inlet guide vanes 100. More specifically, for the embodiment depicted, the plurality of part span inlet guide vanes 100 includes between about twenty part span inlet guide vanes 100 and about fifty part span inlet guide vanes 100. More specifically, for the embodiment depicted, the plurality of part span inlet guide vanes 100 includes between about thirty part span inlet guide vanes 100 and about forty-five part span inlet guide vanes 100, and more specifically, still, the embodiment depicted includes thirty-two part span inlet guide vanes 100. Additionally, for the embodiment depicted, each of the plurality of part span inlet guide vanes 100 are spaced substantially evenly along the circumferential direction C. More specifically, each of the plurality of part span inlet guide vanes 100 defines a circumferential spacing 118 with an adjacent part span inlet guide vane 100, with the circumferential spacing 118 being substantially equal between each adjacent part span inlet guide vane 100.

Although not depicted, in certain exemplary embodiments, the number of part span inlet guide vanes 100 may be substantially equal to the number of fan blades 40 of the fan 38 of the turbofan engine 10. In other embodiments, however, the number of part span inlet guide vanes 100 may be greater than the number of fan blades 40 of the fan 38 of the turbofan engine 10, or alternatively, may be less than the number of fan blades 40 of the fan 38 of the turbofan engine 10.

Figure 4:
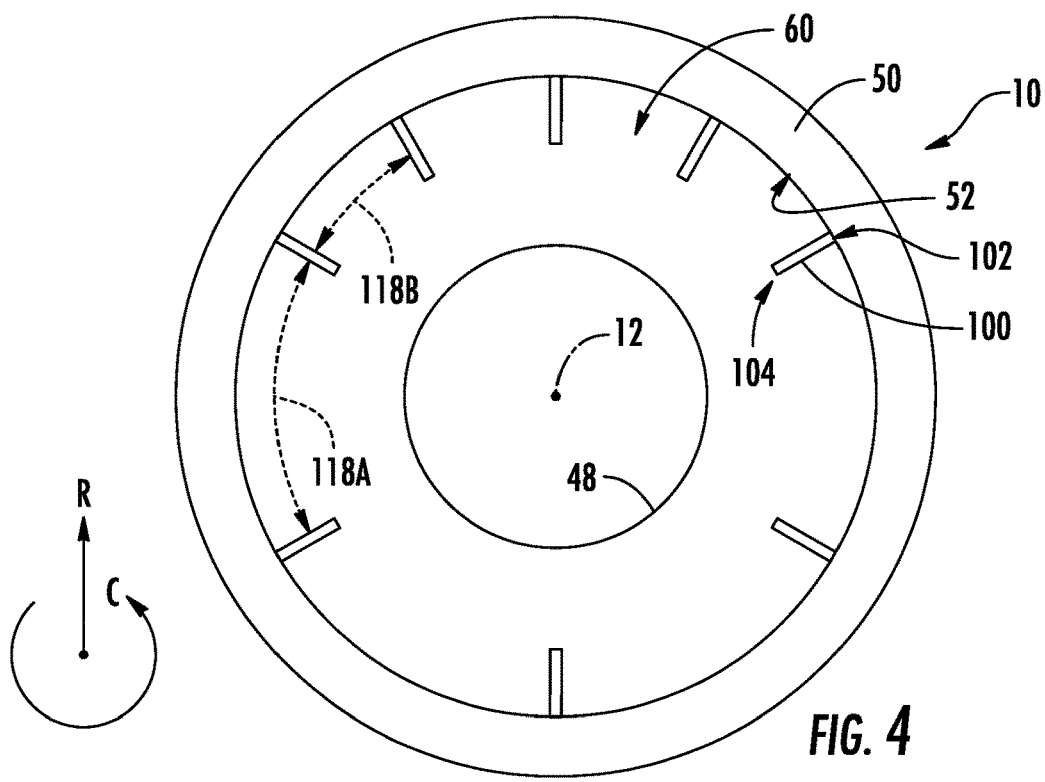
FIG. 4 it is a schematic view of an inlet to a gas turbine engine in accordance with another exemplary embodiment of the present disclosure.

Further, should be appreciated, that in other exemplary embodiments, the turbofan engine 10 may include any other suitable number of part span inlet guide vanes 100 and/or circumferential spacing 118 of the part span inlet guide vanes 100. For example, referring now briefly to FIG. 4, an axial view of an inlet 60 to a turbofan engine 10 in accordance with another exemplary embodiment of the present disclosure is provided. For the embodiment of FIG. 4, the turbofan engine 10 includes less than twenty part span inlet guide vanes 100. More specifically, for the embodiment of FIG. 4, the turbofan engine 10 includes at least eight part span inlet guide vanes 100, or more specifically includes exactly eight part span inlet guide vanes 100. Additionally, for the embodiment of FIG. 4, the plurality of part span inlet guide vanes 100 are not substantially evenly spaced along the circumferential direction C. For example, at least certain of the plurality of part span inlet guide vanes 100 define a first circumferential spacing 118A, while other of the plurality of part span inlet guide vanes 100 define a second circumferential spacing 118B. For the embodiment depicted, the first circumferential spacing 118A is at least about twenty percent greater than the second circumferential spacing 118B, such as at least about twenty-five percent greater such as at least about thirty percent greater, such as up to about two hundred percent greater. Notably, as will be described in greater detail below, the circumferential spacing 118 refers to a mean circumferential spacing between adjacent part span inlet guide vanes 100. The non-uniform circumferential spacing may, e.g., offset structure upstream of the part span inlet guide vanes 100.

Referring back to FIG. 2, it will be appreciated that each of the plurality of part span inlet guide vanes 100 is configured to pre-swirl an airflow 58 provided through the inlet 60 of the nacelle 50, upstream of the plurality of fan blades 40 of the fan 38. As briefly discussed above, pre-swirling the airflow 58 provided through the inlet 60 of the nacelle 50 prior to such airflow 58 reaching the plurality of fan blades 40 of the fan 38 may reduce separation losses and/or shock losses, allowing the fan 38 to operate with the relatively high fan tip speeds described above with less losses of in efficiency.

Figure 5:
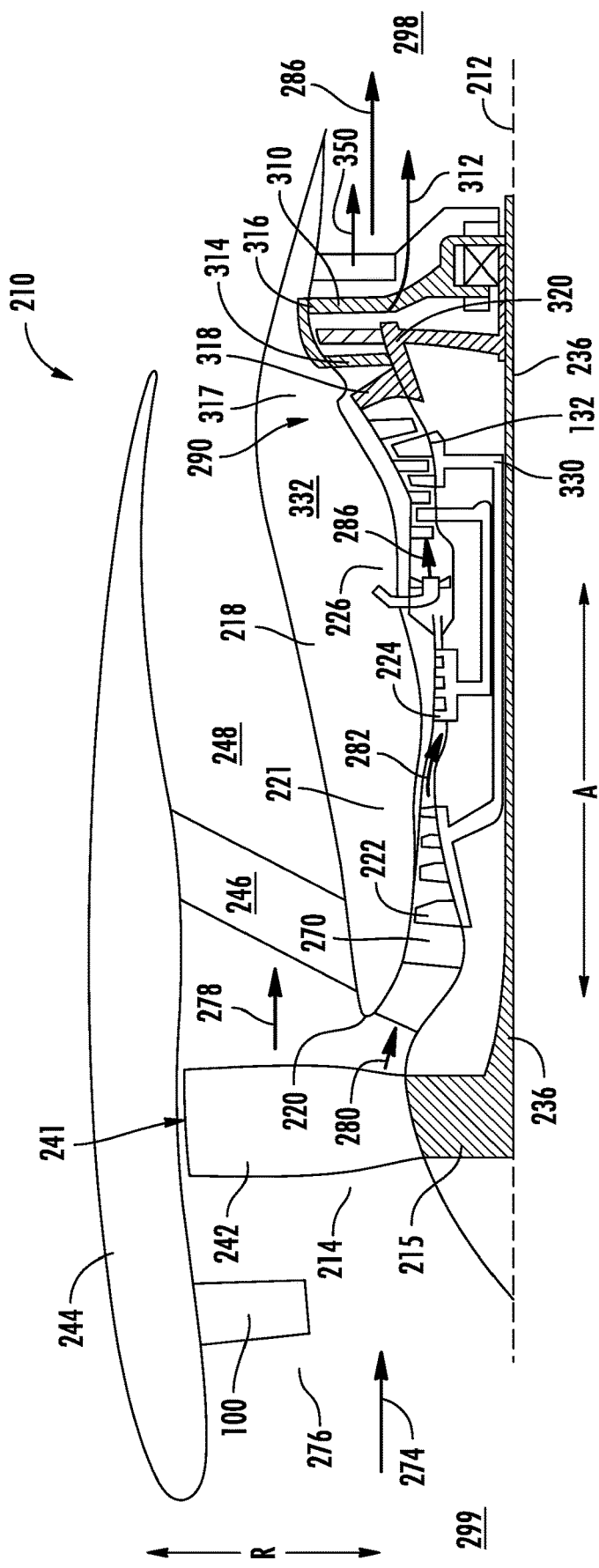
FIG. 5 is a schematic cross-sectional view of an exemplary gas turbine engine according to another exemplary embodiment of the present subject matter.
Figure 6:
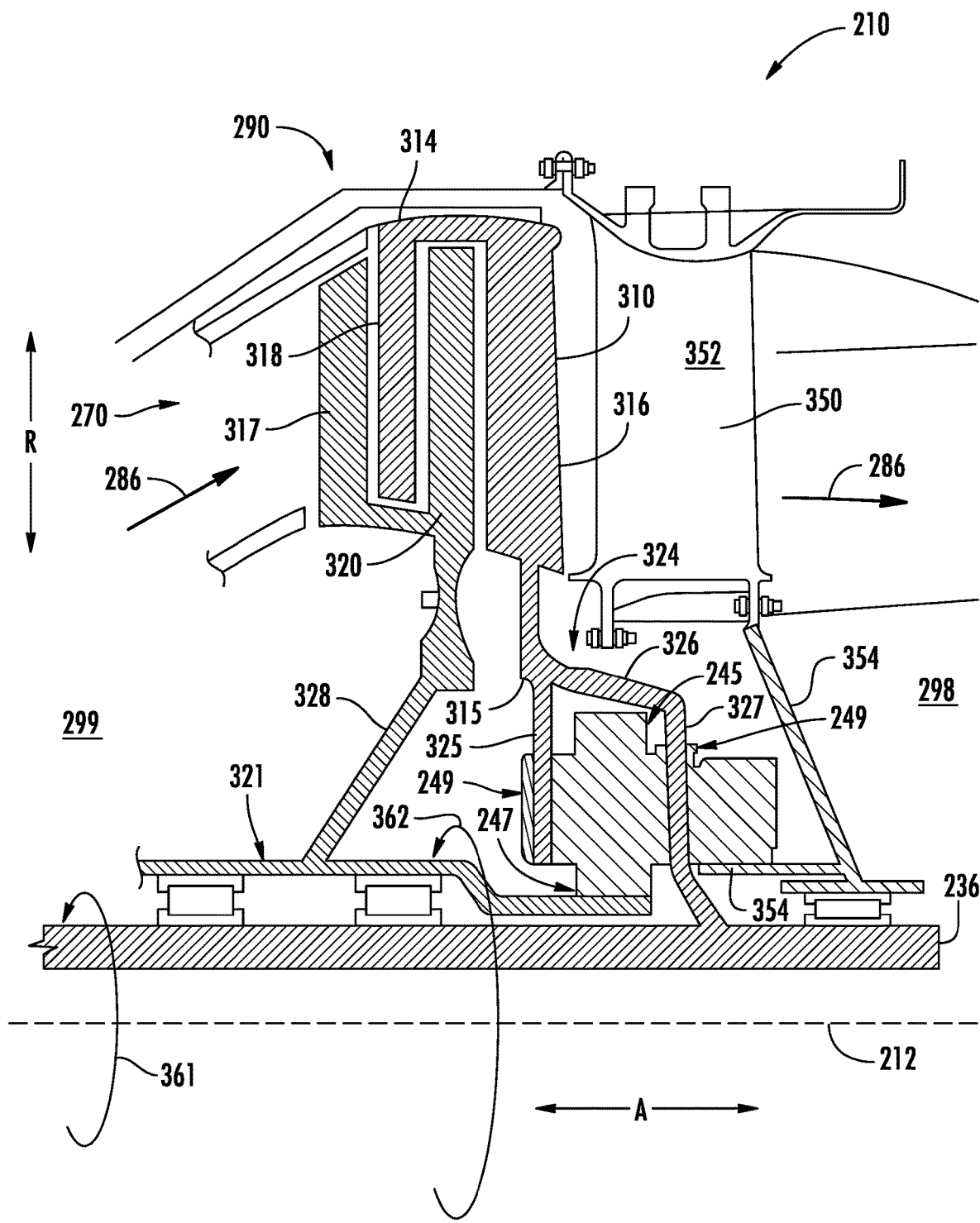
FIG. 6 is a schematic cross sectional view of an embodiment of the turbine section shown in FIG. 5 according to another exemplary embodiment of the present subject matter.

Referring to FIGS. 5 and 6, in another exemplary embodiment, a turbofan engine 210 of the present disclosure includes a turbine section 290 having a vaneless counter rotating turbine.

The embodiment illustrated in FIGS. 5 and 6 includes similar components to the embodiment illustrated in FIGS. 1-4. For the sake of brevity, these similar components and the similar steps of using turbofan engine 210 (FIGS. 5 and 6) will not all be discussed in conjunction with the embodiments illustrated in FIGS. 5 and 6.

Referring to FIGS. 5 and 6, the engine 210 has a longitudinal or axial centerline 212 that extends there through for reference purposes. The engine 210 defines an axial direction L, a radial direction R, an upstream end 299, and a downstream end 298 along the axial direction A.

Referring to FIGS. 5 and 6 the turbine section includes an interdigitated turbine section 290. The engine 210 may include a substantially tubular outer casing 218 that defines an annular inlet 220. In the embodiment shown in FIG. 5, the outer casing 218 encases or at least partially flows, in serial flow arrangement, a compressor section 221, a combustion section 226, and the interdigitated turbine section 290. The compressor section 221 defines a high pressure compressor (HPC) 224 and an intermediate pressure compressor (IPC) 222 in serial arrangement.

A fan assembly 214 is disposed forward or upstream 299 of the compressor section 221. The fan assembly 214 includes a fan rotor 215. The fan rotor 215 includes one or more fan stages 241, in which each fan stage 241 defines a plurality of blades 242 that are coupled to and extend outwardly from the fan rotor 215 in the radial direction R. In an exemplary embodiment, the fan rotor 215 defines a single fan stage or single circumferentially adjacent arrangement of the plurality of blades 242. In various other exemplary embodiments, the fan assembly 214 may further define a plurality of the stages 241. The fan rotor 215 and fan blades 242 are together rotatable about the axial centerline 212. An annular fan casing or nacelle 244 circumferentially surrounds at least a portion of the fan assembly 214 and/or at least a portion of the outer casing 218. In one embodiment, the nacelle 244 may be supported relative to the outer casing 218 by a plurality of circumferentially-spaced outlet guide vanes or struts 246. At least a portion of the nacelle 244 may extend over an outer portion (in radial direction R) of the outer casing 218 so as to define a bypass airflow passage 248 therebetween.

As discussed above, the turbofan engine 210 of the present disclosure also provides pre-swirling flow forward of the fan blade tip. Referring specifically to FIG. 5, the turbofan engine 210 also includes an inlet pre-swirl feature located upstream of the plurality of fan blades 242 and attached to or integrated into the nacelle 244. More specifically, for the embodiment of FIG. 5, the inlet pre-swirl feature is configured as a plurality of part span inlet guide vanes 100 as described above with respect to FIGS. 1-4.

During operation of the engine 210, a volume of air as indicated schematically by arrows 274 enters the engine 210 through an associated inlet 276 of the nacelle and/or fan assembly 214. As the air indicated by arrows 274 passes across the blades 242 of the fan assembly 214, a portion of the air as indicated schematically by arrows 278 is directed or routed into the bypass airflow passage 248 while another portion of the air as indicated schematically by arrows 280 is directed or through the fan assembly 214. The air indicated by arrows 280 is progressively compressed as it flows through the compressor section 221 toward the combustion section 226.

The now compressed air, as indicated schematically by arrows 282, flows into the combustion section 226 where a fuel is introduced, mixed with at least a portion of the compressed air indicated by arrows 282, and ignited to form combustion gases 286. The combustion gases 286 flow into the turbine section 290, causing rotary members of the turbine section 290 to rotate and support operation of respectively coupled rotary members in the compressor section 221 and/or fan assembly 214.

Referring now specifically to FIG. 6, an exemplary embodiment of the turbine section 290 of the engine 210 is generally provided. The turbine section 290 includes a first rotating component 310 interdigitated with a second rotating component 320 along the axial direction A. The first rotating component 310 includes one or more connecting airfoils 316 coupled to a radially extended rotor 315. The second rotating component 320 includes an inner shroud 312 defining a plurality of inner shroud airfoils 317 extended outward of the inner shroud 312 along the radial direction R. In various embodiments, the inner shroud 312 and/or the outer shroud 314 are formed or defined by a plurality of hubs, disks, or drums defining an axial or longitudinal flowpath, such as a portion of a core flowpath 270 of compressed air 282 and combustion gases 286 through the engine 210 from the upstream end 299 to the downstream end 298.

In various embodiments, the first rotating component 310 further includes an outer shroud 314 defining a plurality of outer shroud airfoils 318 extended inward of the outer shroud 314 along the radial direction R. The outer shroud 318 may be coupled to the one or more connecting airfoils 316 and extended forward or upstream. The plurality of outer shroud airfoils 318 may extend inward of the outer shroud 314 in interdigitation with the plurality of inner shroud airfoils 317 extended along the radial direction R from the inner shroud 312 of the second rotating component 320. In various embodiments, the second rotating component 320 is disposed upstream of the one or more connecting airfoils 316 of the first rotating component 310 and in interdigitation with the plurality of outer shroud airfoils 318 extended from the first rotating component 310.

In one embodiment, the first and second rotating components 310, 320 may together define at least three stages of rotating airfoils (e.g., connecting airfoil 316, second rotating component 320, and outer shroud airfoil 318 of first rotating component 310). In another embodiment, the first and second rotating components 310, 320 together define between three and ten stages or rows of rotating airfoils.

The engine 210 further includes a gear assembly 245 within the turbine section 290, such as inward along the radial direction R, or downstream of the turbine section 290 along the axial direction A. For example, the gear assembly 245 may be disposed toward the downstream end 298 of the engine 210. As another example, the gear assembly 245 is disposed downstream of the turbine section 290 within an exhaust frame 350 (e.g., inward of the exhaust frame 250 along the radial direction R and aligned with the exhaust frame 250 along the axial direction A). The gear assembly 245 includes an input accessory 247 and an output accessory 249. A second shaft 321 is connected to the input accessory 247 and provides power into the gear assembly 245. The second rotating component 320 is coupled to the second shaft 321 and provides power into the gear assembly 245. The first rotating component 310 is coupled to the one or more output accessories 249 of the gear assembly 245. The one or more output accessories 249 rotate the first rotating component 310 about the axial centerline 212 at a first speed. The second rotating component 320 coupled to the second shaft 321 and rotates about the axial centerline 212 at a second speed. In various embodiments, the second speed at which the second rotating component 320 rotates is greater than the first speed at which the first rotating component 310 rotates.

Referring still to FIG. 6, the engine 210 further includes a first shaft 236 extended in the axial direction A and through the gear assembly 245 from an upstream end of the gear assembly 245 to a downstream end of the gear assembly 245. The rotor 315 of the first rotating component 310 is coupled to the first shaft 236. In exemplary embodiments, the first shaft 236 may be directly connected to an inner rotor of the counter rotating turbine. In other exemplary embodiments, the first shaft 236 may be connected to an outer rotor of the counter rotating turbine. In various embodiments, the rotor 315 of the first rotating component 310 is rotatably coupled to the one or more output accessories 249 of the gear assembly 245. In one embodiment, the rotor 315 defines a housing 324 generally surrounding the gear assembly 245 and coupled to the first shaft 236. In various embodiments, the housing 324 includes an axial portion 326 and one or more radial portions 325, 327. In one embodiment, a first radial portion 325 extends at least partially in the radial direction R from the rotor 315 to the upstream end of the gear assembly 245. The first radial portion 325 is coupled to the one or more output accessories 249 of the gear assembly 245. In another embodiment, a second radial portion 327 extends at least partially in the radial direction R from the downstream end of the gear assembly 245 to the first shaft 236. The second radial portion 327 is coupled to the one or more output accessories 249 of the gear assembly 245 toward the downstream end 298 of the gear assembly 245.

In one embodiment, such as shown in FIG. 6, the axial portion 326 of the housing 324 may connect the first radial portion 325 and the second radial portion 327 at least partially in the axial direction A. In various embodiments, the first radial portion 325, the second radial portion 327, and/or the axial portion 326 may each define a substantially annular structure generally concentric about the axial centerline 212.

In various embodiments, the second rotating component 320 may define a radially extended rotor portion 328 extended from the second shaft 321 to the inner shroud 312. The rotor portion 328 of the second rotating component 320 is rotatably coupled to the second shaft 321. In various embodiments, the inner shroud 312 and the rotor portion 328 may define an integral structure. In one embodiment, the inner shroud airfoil 317 may further define an integral structure with the rotor portion 328 and inner shroud 312. In another embodiment, the rotor portion 328 defines a hub into which the plurality of inner shroud airfoils 317 installs.

The engine 210 shown and described in regard to FIG. 6 may define a torque path from the second rotating component 320 to the second shaft 321, from the second shaft 321 to the input accessory 247 of the gear assembly 245, and from the one or more output accessories 249 of the gear assembly 245 to the housing 324, such as shown at the second radial portion 327 in FIG. 6, of the first rotating component 310, and from the rotating component 310 to the first shaft 236. Still further, the engine 210 may define the torque path from the first rotating component 310 to the first shaft 236 via the second radial portion 327 of the first rotating component 310. In one embodiment further including the axial portion 326 of the first rotating component 310, the torque path may be defined from the first rotating component 310 through housing 324, such as through the axial portion 326 to the second radial portion 327, and to the first shaft 236.

In various embodiments, the first rotating component 310 rotates in a first direction 361 and the second rotating component 320 rotates in a second direction 362 opposite of the first direction 361. The first rotating component 310, and the output accessory 249 of the gear assembly 245 to which the first rotating component 310 via the first shaft 236, rotates in the first direction 361 as the second rotating component 320, coupled to the input accessory 247 of the gear assembly 245 via the second shaft 321, rotates in the second direction 362. In exemplary embodiments, the gear assembly 245 is configured as a reversing reduction gear assembly.

In various embodiments, the gear assembly 245 defines a plurality of gears in which the input accessory 247 rotates at a speed greater than the output accessory 249 or the first shaft 236 receiving power from the gear assembly 245. As such, the second rotating component 320 rotates at a speed greater than the first rotating component 310. Additionally, the second rotating component 320 rotates at a speed greater than the first rotating component 310 in a direction opposite of the first rotating component 310.

In exemplary embodiments, a gear ratio of the gear assembly 245 is greater than or equal to 1.2 and less than or equal to 3.0. In some exemplary embodiments, the gear ratio of the gear box 46 is greater than or equal to 1.2 and less than or equal to 2.6. In other exemplary embodiments, the gear ratio of the gear box 46 is greater than or equal to 1.2 and less than or equal to 2.0.

It should be appreciated that the exemplary turbofan engine described operates contrary to conventional teachings. Specifically, conventional engine operation teachings generally attempt to minimize fan speed with such gear ratios. For example, conventional engine operation teach low fan speeds for better efficiencies. However, the turbofan engine described herein operates contrary to these teachings by reducing the gear ratio while operating at a high fan tip speed, while maintaining a relatively low fan pressure ratio. The turbofan engine of the present disclosure achieves improved system efficiencies by enabling higher fan tip speeds at lower fan pressure ratios. Furthermore, the turbofan engine of the present disclosure also provides pre-swirling flow forward of the fan blade tip as described herein.

In exemplary embodiments, the turbofan engine 210 of the present disclosure causes the fan blades 242 to rotate at a relatively high rotational speed. For example, during operation of the turbofan engine 210 at the rated speed, the fan tip speed of each of the plurality of fan blades 242 is greater than or equal to 1000 feet per second and less than or equal to 2250 feet per second. In certain exemplary embodiments, during operation of the turbofan engine 210 at the rated speed, the fan tip speed of each of the fan blades 242 may be greater than or equal to 1,250 feet per second and less than or equal to 2250 feet per second. In certain exemplary embodiments, during operation of the turbofan engine 210 at the rated speed, the fan tip speed of each of the fan blades 242 may be greater than or equal to about 1,350 feet per second, such as greater than about 1,450 feet per second, such as greater than about 1,550 feet per second, and less than or equal to 2250 feet per second.

In exemplary embodiments, the fan 214 of the turbofan engine 210 defines a relatively low fan pressure ratio. For example, the turbofan engine 210 depicted defines a fan pressure ratio less than or equal to about 1.5. For example, in certain exemplary embodiments, the turbofan engine 210 may define a fan pressure ratio less than or equal to about 1.4. The fan pressure ratio may be the fan pressure ratio of the fan 214 during operation of the turbofan engine 210, such as during operation of the turbofan engine 210 at a rated speed.

In some exemplary embodiments, the gear assembly 245 may define a compound gearbox. In some exemplary embodiments, the gear assembly 245 defines a reversing rotating compound gearbox.

Referring still to FIG. 6, the engine 210 further includes the exhaust frame 350 disposed aft or downstream 298 of the first and second rotating components 310, 320. The exhaust frame 350 includes one or more exhaust vanes 352 extended in the radial direction R. The exhaust frame 350 further includes a static support structure 354 extended inward along the radial direction R. The support structure 354 generally defines a static annular casing defining one or more fastening locations. The gear assembly 245 is coupled to the exhaust frame 350 at the support structure 354. In various embodiments, the gear assembly 245 and the support structure 354 together transfer torque or power from the second rotating component 320 through the gear assembly 245 to the first shaft 236 via the second radial portion 327 of the first rotating component 310.

In various embodiments, the exhaust frame 350 further includes a cap covering or concealing the gear assembly 245 within the exhaust frame 350 from external view and environmental conditions. The cap may be removed to provide relatively quick access to the gear assembly 245, the first shaft 236, or other components of the engine 210 with rear mounted gear assembly 245, in proximity to an unobstructed aft, outside portion of the engine 210, in contrast to a forward mounted gear assembly configuration (e.g., within a fan assembly or low pressure compressor), in which the fan assembly is generally removed to access the gear assembly.

Referring still to FIG. 6, in various embodiments, the first and second rotating component 310, 320 together define a low pressure turbine (LPT) rotor. In such embodiments, the first shaft 236 defines a low pressure (LP) shaft connected and rotatable with the fan rotor 215 of the fan assembly 214. The fan assembly 214 is driven collectively by the first rotating component 310 and the second rotating component 320. By arranging the engine 210 such that the first rotating component 310 is coupled directly to the first shaft 236 that is coupled to the fan rotor 215, and by arranging the second rotating component 320 as coupled to the gear assembly 245 that is coupled at the output accessory 249 to the first shaft 236, in one embodiment the first rotating component 310 transmits approximately 25% to about 75% of power or torque for rotation of the fan assembly 214. In another embodiment, the second rotating component 320 transmits approximately 30% to about 60% of power or torque for rotation of the fan assembly 214, in which the second rotating component 320 transmits power or torque through the gear assembly 245 to the first shaft 236 to the fan assembly 214. Additionally, interdigitating the first and second rotating components 310, 320 to define the LPT rotor results in efficiency and performance benefits due to relatively large flowpath velocities, reduced airfoil count (i.e., removed stationary vanes between rotating components), and/or reduced longitudinal dimensions of the LPT rotor.

Referring now back to FIG. 5, the turbine section 290 further includes a third rotating component 330 disposed forward or upstream of the one or more connecting airfoils 316 of the first rotating component 310. The third rotating component 330 includes a plurality of third airfoils 332 extended outward along the radial direction R. In one embodiment, the third rotating component 330 is disposed forward or upstream 299 of the first and second rotating component 310, 320.

In exemplary embodiments, the counter rotating turbine engine with reversing reduction gear assembly may further increase engine efficiency and performance by providing a turbine and gear assembly arrangement that permits a three-spool engine configuration.

It will be appreciated, however, that in other exemplary embodiments, a two-spool engine configuration in which the low pressure compressor is driven by the counter rotating turbine in addition to the fan may be provided. Further, in other exemplary embodiments, the gear assembly 245 may, e.g., be located forward of the combustion section 226. Moreover, although the embodiment of FIG. 6 depicts one or more bearings, in other embodiments the engine may include any other configuration of bearings positioned at any other suitable location.

Figure 7:
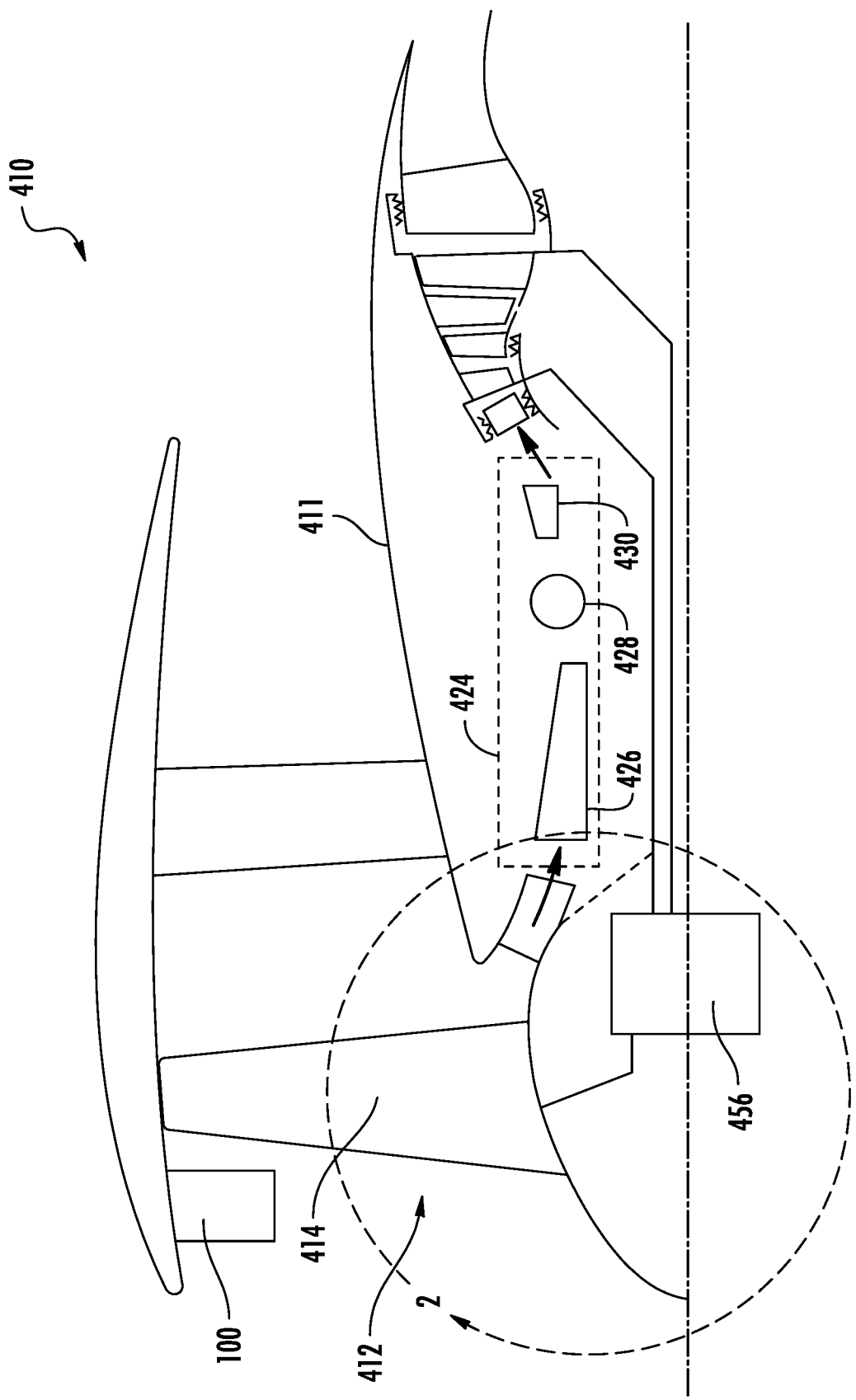
FIG. 7 is a schematic cross-sectional view of an exemplary gas turbine engine according to another exemplary embodiment of the present subject matter.

Referring now to FIG. 7, a schematic cross-sectional view of an exemplary gas turbine engine according to another exemplary embodiment of the present subject matter is provided. In the exemplary embodiment of FIG. 7, a turbofan engine 410 is provided that includes a differential gear box 456 that drives a fan 412 at a different speed than a vaneless counter rotating turbine.

Referring to FIG. 7, housed within engine frame 411 is an engine core portion designated generally 424 which serves as the combustion gas generator means for engine 410. In an exemplary embodiment, core portion 424 includes high pressure compressor 426, combustion chamber 428, and turbine assembly 430 for driving compressor 426, all depicted schematically in FIG. 7.

For example, the differential gear box 456 is inserted between a turbine assembly 430, e.g., a counter rotating turbine, and the fan 412. Referring to FIG. 7, the differential gear box 456 is driven by the rotors of the turbine assembly 430, e.g., a counter rotating turbine, with the output connected to a shaft of the fan 412. This enables the turbine to operate at a very high speed, while keeping a low fan pressure ratio as described herein.

In exemplary embodiments, a gear ratio of the differential gear box 456 is greater than or equal to 1.2 and less than or equal to 3.0. In some exemplary embodiments, the gear ratio of the differential gear box 456 is greater than or equal to 1.2 and less than or equal to 2.6. In other exemplary embodiments, the gear ratio of the differential gear box 456 is greater than or equal to 1.2 and less than or equal to 2.0. Notably, for a gear box including two input power sources and a single output power source, the gear ratio may be measured as the ratio of a rotational speed quickest input (in RPM) to a rotational speed of the output (also in RPM).

In exemplary embodiments, the turbine section 290 (FIGS. 5 and 6) or turbine assembly 430 (FIG. 7), e.g., a counter rotating turbine, includes one or more of the rotating or rotor components, e.g., a first turbine rotor and a second turbine rotor, and the gear box comprises a differential gear box 456 (FIG. 7), wherein the fan 214, 412 rotates in a same direction and at a same speed as the first turbine rotor, and wherein the second turbine rotor is geared via the differential gear box 456. In such embodiments, one of the inputs is also directly tied to the output. For example, it is contemplated that a sun gear and a ring gear may be tied together, and a planetary carrier may be the other input.

It should be appreciated that the exemplary turbofan engine described operates contrary to conventional teachings. Specifically, conventional engine operation teachings generally attempt to minimize fan speed with such gear ratios. For example, conventional engine operation teach low fan speeds for better efficiencies. However, the turbofan engine described herein operates contrary to these teachings by reducing the gear ratio while operating at a high fan tip speed, while maintaining a relatively low fan pressure ratio. The turbofan engine of the present disclosure achieves improved system efficiencies by enabling higher fan tip speeds at lower fan pressure ratios. Furthermore, the turbofan engine of the present disclosure also provides preswirling flow forward of the fan blade tip as described herein.

In exemplary embodiments, the turbofan engine 410 of the present disclosure causes fan blades 414 of the fan 412 to rotate at a relatively high rotational speed. For example, during operation of the turbofan engine 410 at the rated speed, the fan tip speed of each of the plurality of fan blades 414 is greater than or equal to 1000 feet per second and less than or equal to 2250 feet per second. In certain exemplary embodiments, during operation of the turbofan engine 410 at the rated speed, the fan tip speed of each of the fan blades 414 may be greater than or equal to 1,250 feet per second and less than or equal to 2250 feet per second. In certain exemplary embodiments, during operation of the turbofan engine 410 at the rated speed, the fan tip speed of each of the fan blades 414 may be greater than or equal to about 1,350 feet per second, such as greater than about 1,450 feet per second, such as greater than about 1,550 feet per second, and less than or equal to 2250 feet per second.

In exemplary embodiments, the fan 412 of the turbofan engine 410 defines a relatively low fan pressure ratio. For example, the turbofan engine 410 depicted defines a fan pressure ratio less than or equal to about 1.5. For example, in certain exemplary embodiments, the turbofan engine 410 may define a fan pressure ratio less than or equal to about 1.4. The fan pressure ratio may be the fan pressure ratio of the fan 412 during operation of the turbofan engine 410, such as during operation of the turbofan engine 410 at a rated speed.

Figure 8:
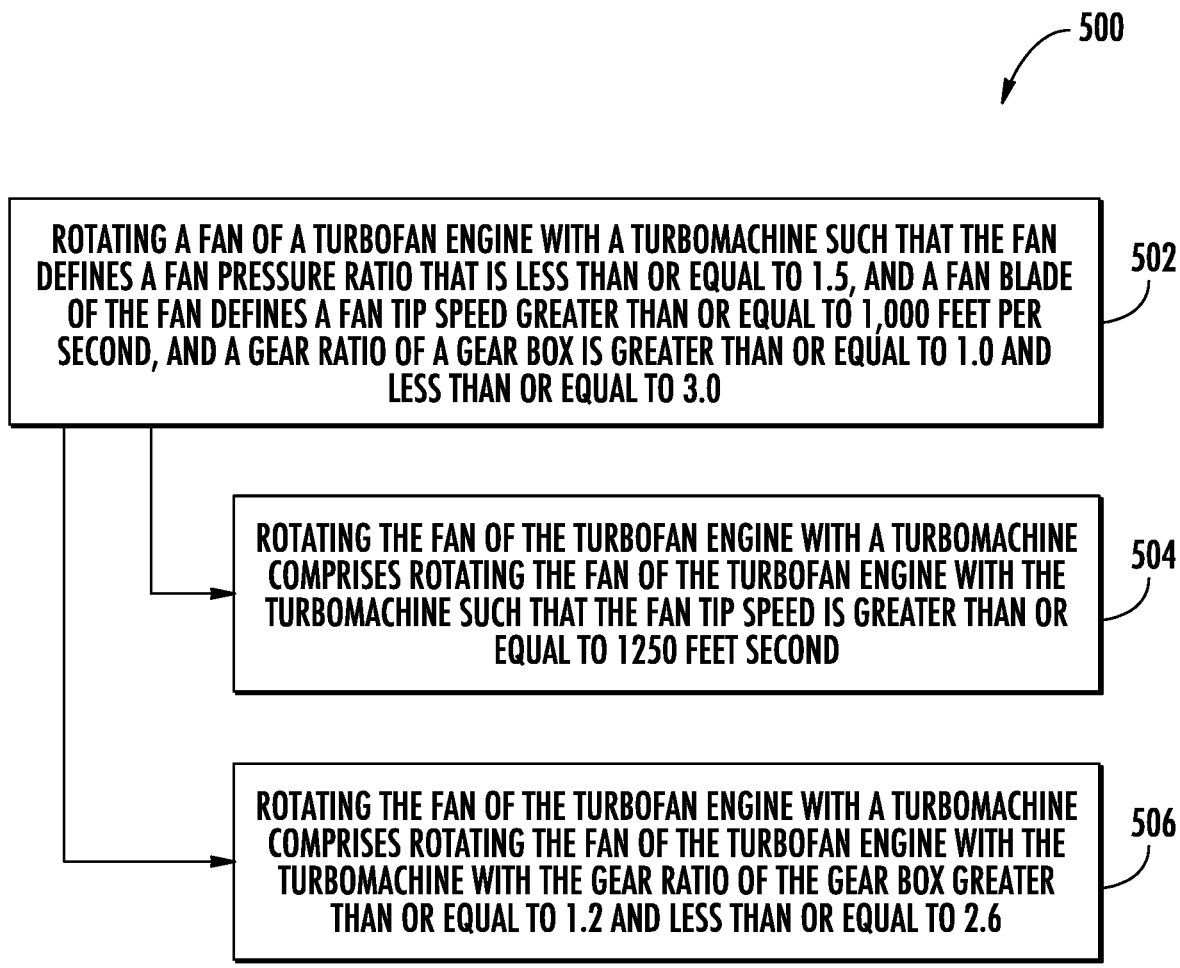
FIG. 8 is a flow diagram of a method for operating a turbofan engine in accordance with an exemplary aspect of the present disclosure.

Referring now to FIG. 8, a method 500 of operating a turbofan engine comprising a fan, a turbomachine, and a gear box, wherein the turbomachine is operably coupled to the fan through the gear box is depicted. The exemplary method 500 may be utilized to operate one or more of the engines described above with reference to FIGS. 1 through 7.

For the exemplary aspect of FIG. 8, the method 500 generally includes at (502) rotating a fan of a turbofan engine with a turbomachine such that the fan defines a fan pressure ratio that is less than or equal to 1.5, and a fan blade of the fan defines a fan tip speed greater than or equal to 1,000 feet per second, and a gear ratio of a gear box is greater than or equal to 1.2 and less than or equal to 3.0 as described in detail above with reference to FIGS. 1 through 7.

For the exemplary aspect depicted, rotating the fan of the turbofan engine with the turbomachine includes at (504) rotating the fan of the turbofan engine with the turbomachine such that the fan tip speed is greater than or equal to 1250 feet per second.

For the exemplary aspect depicted, rotating the fan of the turbofan engine with the turbomachine includes at (506) rotating the fan of the turbofan engine with the turbomachine with the gear ratio of the gear box greater than or equal to 1.2 and less than or equal to 2.6.

It should be appreciated that the exemplary turbofan engine described operates contrary to conventional teachings. Specifically, conventional engine operation teachings generally attempt to minimize fan speed with such gear ratios.

For example, conventional engine operation teach low fan speeds for better efficiencies. However, the turbofan engine described herein operates contrary to these teachings by reducing the gear ratio while operating at a high fan tip speed, while maintaining a relatively low fan pressure ratio. The turbofan engine of the present disclosure achieves improved system efficiencies by enabling higher fan tip speeds at lower fan pressure ratios. Furthermore, the turbofan engine of the present disclosure also provides pre-swirling flow forward of the fan blade tip as described herein.

Further aspects of the disclosure are provided by the subject matter of the following clauses:

1. A turbofan engine comprising: a fan comprising a plurality of rotatable fan blades, each fan blade defining a fan tip speed; a turbomachine operably coupled to the fan for driving the fan, the turbomachine comprising a compressor section, a combustion section, and a turbine section in serial flow order and together defining a core air flowpath; and a gear box, wherein the turbomachine is operably coupled to the fan through the gear box, wherein a gear ratio of the gear box is greater than or equal to 1.2 and less than or equal to 3.0; wherein during operation of the turbofan engine at a rated speed the fan tip speed is greater than or equal to 1000 feet per second.

2. The turbofan engine of any preceding clause, wherein the fan defines a fan pressure ratio during operation of the turbofan engine, and wherein during operation of the turbofan engine at the rated speed the fan pressure ratio is less than or equal to about 1.5.

3. The turbofan engine of any preceding clause, wherein during operation of the turbofan engine at the rated speed the fan tip speed is greater than or equal to 1250 feet per second and less than or equal to 2250 feet per second.

4. The turbofan engine of any preceding clause, wherein the gear ratio of the gear box is greater than or equal to 1.2 and less than or equal to 2.6.

5. The turbofan engine of any preceding clause, wherein the gear ratio of the gear box is greater than or equal to 1.2 and less than or equal to 2.0.

6. The turbofan engine of any preceding clause, further comprising an outer nacelle at least partially surrounding the fan and the turbomachine, the outer nacelle defining a bypass passage with the turbomachine.

7. The turbofan engine of any preceding clause, further comprising a part span inlet guide vane extending from the outer nacelle at a location forward of the plurality of fan blades of the fan along an axial direction and aft of an inlet of the outer nacelle.

8. The turbofan engine of any preceding clause, wherein the part span inlet guide vane is configured to pre-swirl an airflow provided through the inlet of the outer nacelle and upstream of the plurality of fan blades of the fan.

9. The turbofan engine of any preceding clause, wherein the turbine section comprises a counter rotating turbine.

10. The turbofan engine of any preceding clause, wherein the gear box comprises a differential gear box that drives the fan at a different speed than the counter rotating turbine.

11. The turbofan engine of any preceding clause, wherein the counter rotating turbine includes a first turbine rotor and a second turbine rotor and the gear box comprises a differential gear box, wherein the fan rotates in a same direction and at a same speed as the first turbine rotor, and wherein the second turbine rotor is geared via the differential gear box.

12. A method of operating a turbofan engine comprising a fan, a turbomachine, and a gear box, wherein the turbomachine is operably coupled to the fan through the gear box, the method comprising: rotating the fan of the turbofan engine with the turbomachine such that the fan defines a fan pressure ratio that is less than or equal to 1.5, and a fan blade of the fan defines a fan tip speed greater than or equal to 1,000 feet per second, and a gear ratio of the gear box is greater than or equal to 1.2 and less than or equal to 3.0.

13. The method of any preceding clause, wherein rotating the fan of the turbofan engine with the turbomachine comprises rotating the fan of the turbofan engine with the turbomachine such that the fan tip speed is greater than or equal to 1250 feet per second and less than or equal to 2250 feet per second.

14. The method of any preceding clause, wherein rotating the fan of the turbofan engine with the turbomachine comprises rotating the fan of the turbofan engine with the turbomachine with the gear ratio of the gear box greater than or equal to 1.2 and less than or equal to 2.6.

15. The method of any preceding clause, wherein rotating the fan of the turbofan engine with the turbomachine comprises rotating the fan of the turbofan engine with the turbomachine with the gear ratio of the gear box greater than or equal to 1.2 and less than or equal to 2.0.

16. The method of any preceding clause, further comprising pre-swirling a flow of air provided to the fan of the turbofan engine during operation of the turbofan engine.

17. The method of any preceding clause, wherein pre-swirling the flow of air provided to the fan of the turbofan engine comprises pre-swirling the flow of air provided to the fan of the turbofan engine using an inlet pre-swirl feature located upstream of the fan blade of the fan and attached to or integrated into a nacelle of the turbofan engine.

18. The method of any preceding clause, wherein the turbomachine comprises a compressor section, a combustion section, and a turbine section in serial flow order and together defining a core air flowpath, and wherein the turbine section comprises a counter rotating turbine.

19. The method of any preceding clause, wherein the gear box comprises a differential gear box that drives the fan at a different speed than the counter rotating turbine.

20. The method of any preceding clause, wherein the counter rotating turbine includes a first turbine rotor and a second turbine rotor and the gear box comprises a differential gear box, wherein the fan rotates in a same direction and at a same speed as the first turbine rotor, and wherein the second turbine rotor is geared via the differential gear box.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:
1. A turbofan engine comprising:
a fan comprising a plurality of rotatable fan blades, each fan blade defining a fan tip speed;
a turbomachine operably coupled to the fan for driving the fan, the turbomachine comprising a compressor sec- tion, a combustion section, and a turbine section in serial flow order and together defining a core air flowpath;

a gear box, wherein the turbomachine is operably coupled to the fan through the gear box, wherein a gear ratio of the gear box is greater than or equal to 1.2 and less than or equal to 3.0;

an outer nacelle at least partially surrounding the fan and the turbomachine, the outer nacelle defining a bypass passage with the turbomachine; and a part span inlet guide vane extending from the outer nacelle at a location forward of the plurality of rotatable fan blades of the fan along an axial direction and aft of an inlet of the outer nacelle, wherein during operation of the turbofan engine at a rated speed the fan tip speed is greater than or equal to 1000 feet per second, and wherein the fan defines a fan pressure ratio during operation of the turbofan engine, and wherein during operation of the turbofan engine at the rated speed the fan pressure ratio is less than or equal to about 1.5.

2. The turbofan engine of claim 1, wherein the gear ratio of the gear box is greater than or equal to 1.2 and less than or equal to 2.6.

3. The turbofan engine of claim 1, wherein the gear ratio of the gear box is greater than or equal to 1.2 and less than or equal to 2.0.

4. The turbofan engine of claim 1, wherein the part span inlet guide vane is configured to pre-swirl an airflow provided through the inlet of the outer nacelle and upstream of the plurality of rotatable fan blades of the fan.

5. The turbofan engine of claim 1, wherein the turbine section comprises a counter rotating turbine.

6. The turbofan engine of claim 5, wherein the gear box comprises a differential gear box that drives the fan at a different speed than the counter rotating turbine.

7. The turbofan engine of claim 5, wherein the counter rotating turbine includes a first turbine rotor and a second turbine rotor and the gear box comprises a differential gear box, wherein the fan rotates in a same direction and at a same speed as the first turbine rotor, and wherein the second turbine rotor is geared via the differential gear box.

8. The turbofan engine of claim 1, wherein during operation of the turbofan engine at the rated speed the fan tip speed is greater than or equal to 1000 feet per second and less than or equal to 2250 feet per second.

9. The turbofan engine of claim 1, wherein during operation of the turbofan engine at the rated speed the fan tip speed is greater than or equal to 1250 feet per second and less than or equal to 2250 feet per second.

10. The turbofan engine of claim 1, wherein during operation of the turbofan engine at the rated speed the fan tip speed is greater than or equal to 1350 feet per second and less than or equal to 2250 feet per second.

11. A turbofan engine comprising:
a fan comprising a plurality of rotatable fan blades, each fan blade defining a fan tip speed;
a turbomachine operably coupled to the fan for driving the fan;
a gear box, wherein the turbomachine is operably coupled to the fan through the gear box, wherein a gear ratio of the gear box is greater than or equal to 1.2 and less than or equal to 3.0;
an outer nacelle at least partially surrounding the fan and the turbomachine; and
a part span inlet guide vane extending from the outer nacelle at a location forward of the plurality of rotatable fan blades of the fan along an axial direction and aft of an inlet of the outer nacelle,
wherein the part span inlet guide vane is configured to pre-swirl an airflow provided through the inlet of the outer nacelle and upstream of the plurality of rotatable fan blades of the fan,
wherein during operation of the turbofan engine at a rated speed the fan tip, wherein during operation of the turbofan engine at the rated speed the fan tip speed is greater than or equal to 1250 feet per second and less than or equal to 2250 feet per second.

12. The turbofan engine of claim 11, wherein the fan defines a fan pressure ratio during operation of the turbofan engine, and wherein during operation of the turbofan engine at the rated speed the fan pressure ratio is less than or equal to about 1.5.

13. The turbofan engine of claim 11, wherein the gear ratio of the gear box is greater than or equal to 1.2 and less than or equal to 2.6.

14. The turbofan engine of claim 11, wherein the gear ratio of the gear box is greater than or equal to 1.2 and less than or equal to 2.0.

15. The turbofan engine of claim 11, wherein the turbomachine includes a turbine section, and wherein the turbine section comprises a counter rotating turbine.

16. The turbofan engine of claim 15, wherein the gear box comprises a differential gear box that drives the fan at a different speed than the counter rotating turbine.

17. The turbofan engine of claim 15, wherein the counter rotating turbine includes a first turbine rotor and a second turbine rotor and the gear box comprises a differential gear box, wherein the fan rotates in a same direction and at a same speed as the first turbine rotor, and wherein the second turbine rotor is geared via the differential gear box.

* * * * *